United States Patent
Jeong et al.

(10) Patent No.: US 10,907,859 B2
(45) Date of Patent: Feb. 2, 2021

(54) HEAT EXCHANGER

(71) Applicant: KYUNGDONG NAVIEN CO., LTD., Pyeongtaek-si (KR)

(72) Inventors: Inchul Jeong, Seoul (KR); Tae Hyun Hwnag, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 265 days.

(21) Appl. No.: 16/072,409

(22) PCT Filed: Feb. 3, 2017

(86) PCT No.: PCT/KR2017/001183
§ 371 (c)(1),
(2) Date: Jul. 24, 2018

(87) PCT Pub. No.: WO2017/135727
PCT Pub. Date: Aug. 10, 2017

(65) Prior Publication Data
US 2018/0363946 A1     Dec. 20, 2018

(30) Foreign Application Priority Data
Feb. 5, 2016    (KR) ........................ 10-2016-0015085

(51) Int. Cl.
*B23K 1/00*       (2006.01)
*B23K 101/14*    (2006.01)
(Continued)

(52) U.S. Cl.
CPC ............. *F24H 1/34* (2013.01); *B23K 1/0012* (2013.01); *F24H 1/40* (2013.01); *F24H 9/0026* (2013.01);
(Continued)

(58) Field of Classification Search
CPC ..... B23K 1/0012; B23K 2101/14; F24H 1/32; F24H 1/34; F24H 1/40; F24H 9/0026;
(Continued)

(56) References Cited

U.S. PATENT DOCUMENTS 9,702,589 B2 *   7/2017   Kim ........................ F24H 1/145
2017/0059201 A1 *   3/2017   Kim .......................... F24H 1/38

FOREIGN PATENT DOCUMENTS

EP        1 211 473 A2    6/2002
JP        2006-214628 A    8/2006
(Continued)

OTHER PUBLICATIONS

Family Handyman, How to Solder Copper Pipe, Jul. 14, 2013, Home Service Publications, Inc., https://www.familyhandyman.com/plumbing/how-to-solder-copper-pipe/ (Year: 2013).*
(Continued)

*Primary Examiner* — Filip Zec
*Assistant Examiner* — Chang H Park
(74) *Attorney, Agent, or Firm* — Stein IP, LLC

(57) ABSTRACT

The present subject matter includes: a heat exchange part having heating medium channels, through which heating medium flows, and combustion gas channels, through which combustion gas burned in a burner flows, adjacently disposed in alternation in the spaces between the plurality of plates; a first welding part in which the outer edges of a pair of plates forming the heating medium channel are welded together; a second welding part in which the plates forming the combustion gas channel, between the plates forming the heating medium channel, are welded to the outer edges of the plates forming the heating medium channel to form; and a guide part for guiding the welding material molten solution of the first welding part into moving to the second welding part.

9 Claims, 16 Drawing Sheets

(51) Int. Cl.
*F24H 1/32* (2006.01)
*F24H 1/34* (2006.01)
*F24H 1/40* (2006.01)
*F24H 9/00* (2006.01)
*F28D 20/02* (2006.01)
*F28D 9/00* (2006.01)
*F28F 3/02* (2006.01)
*F28F 3/04* (2006.01)
*F28F 9/02* (2006.01)

(52) U.S. Cl.
CPC ......... *F28D 9/0093* (2013.01); *F28D 20/026* (2013.01); *B23K 2101/14* (2018.08); *F24H 1/32* (2013.01); *F28D 9/005* (2013.01); *F28F 3/025* (2013.01); *F28F 3/046* (2013.01); *F28F 9/028* (2013.01); *F28F 2250/104* (2013.01); *Y02E 60/14* (2013.01)

(58) Field of Classification Search
CPC ...... F28D 20/026; F28D 9/005; F28D 9/0093; F28F 2250/104; F28F 3/025; F28F 3/046; F28F 9/028; Y02E 60/145
See application file for complete search history.

(56) References Cited

FOREIGN PATENT DOCUMENTS

| | | | |
|---|---|---|---|
| KR | 1996-0024209 A | 7/1996 | |
| KR | 10-2006-0116732 A | 11/2006 | |
| KR | 10-0813807 B1 | 3/2008 | |
| KR | 100813807 B1 | 3/2008 | |
| KR | 20130006062 A * | 1/2013 | |
| KR | 10-2015-0108450 A | 9/2015 | |
| KR | 10-2015-0108959 A | 10/2015 | |
| KR | 20150108959 A * | 10/2015 | ........... F28D 9/0093 |
| KR | 10-2016-0002438 A | 1/2016 | |

OTHER PUBLICATIONS

Dover, SWEP: What is a Brazed Plate Heat Exchanger (BPHE), Nov. 7, 2014, 0:31, 0:40, 0:44, https://www.youtube.com/watch?v=5WgnJ8e49pg (Year: 2014).*
International Search Report dated Apr. 27, 2017, issued to International Application No. PCT/KR2017/001183.

* cited by examiner

[FIG. 5]
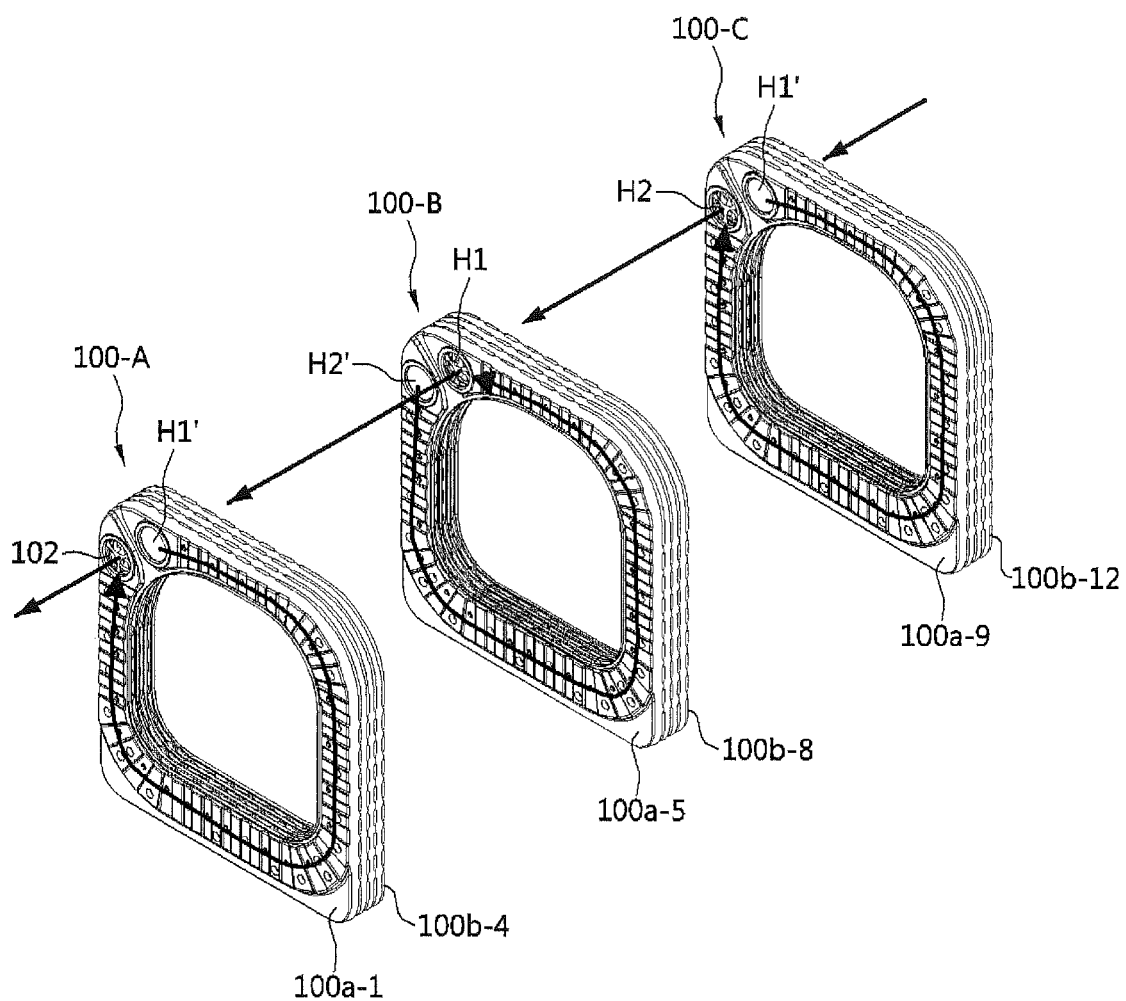

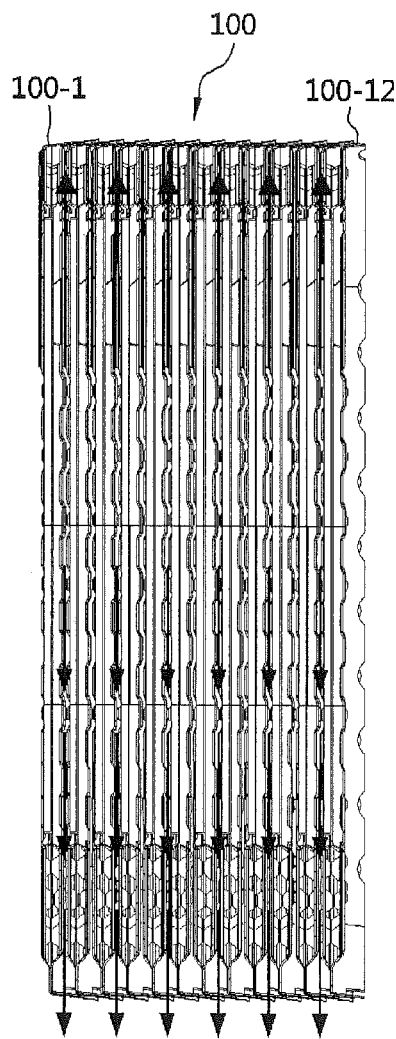
[FIG. 6]

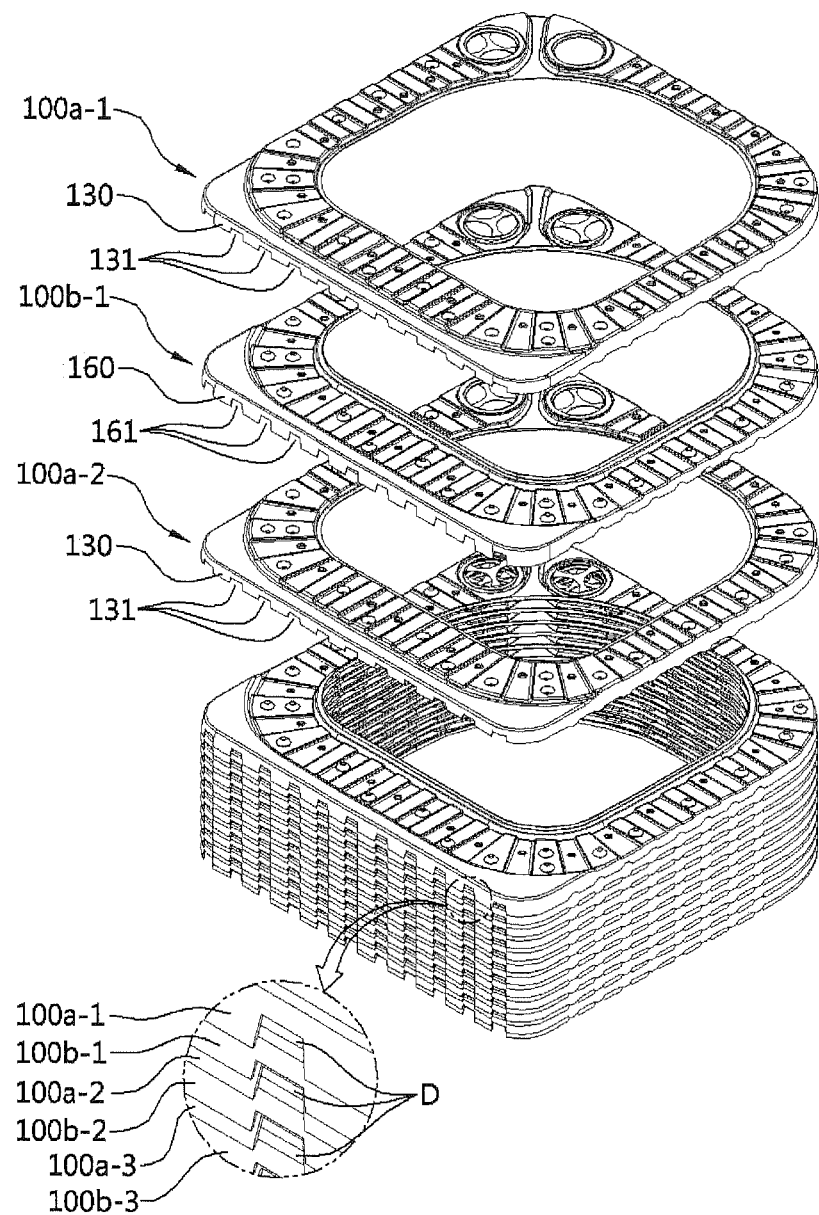
[FIG. 7]

[FIG. 8]
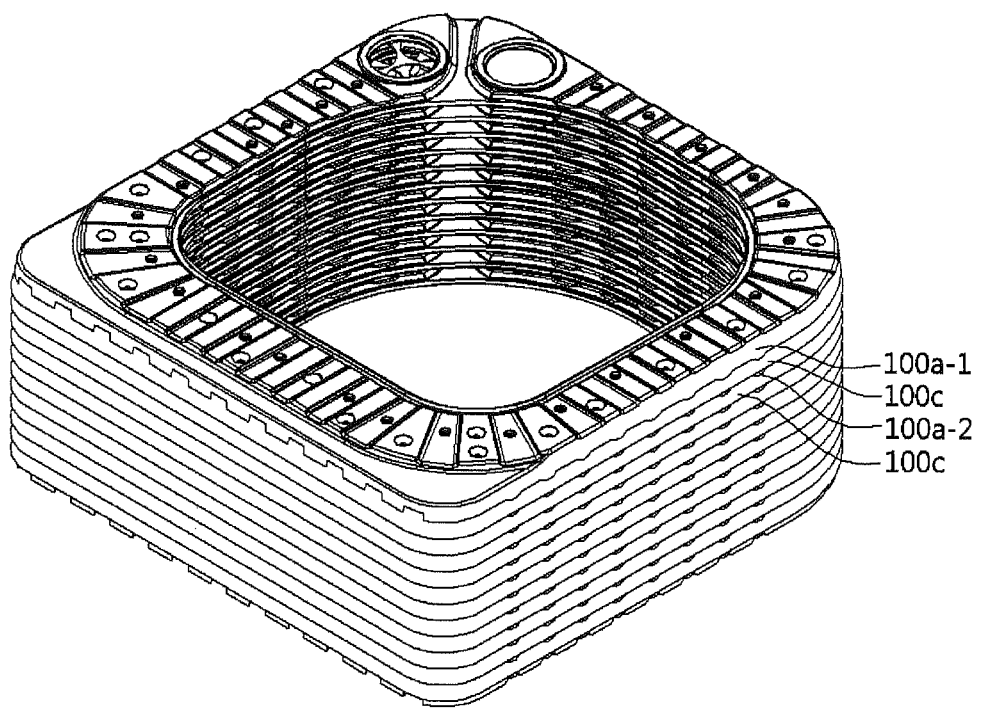

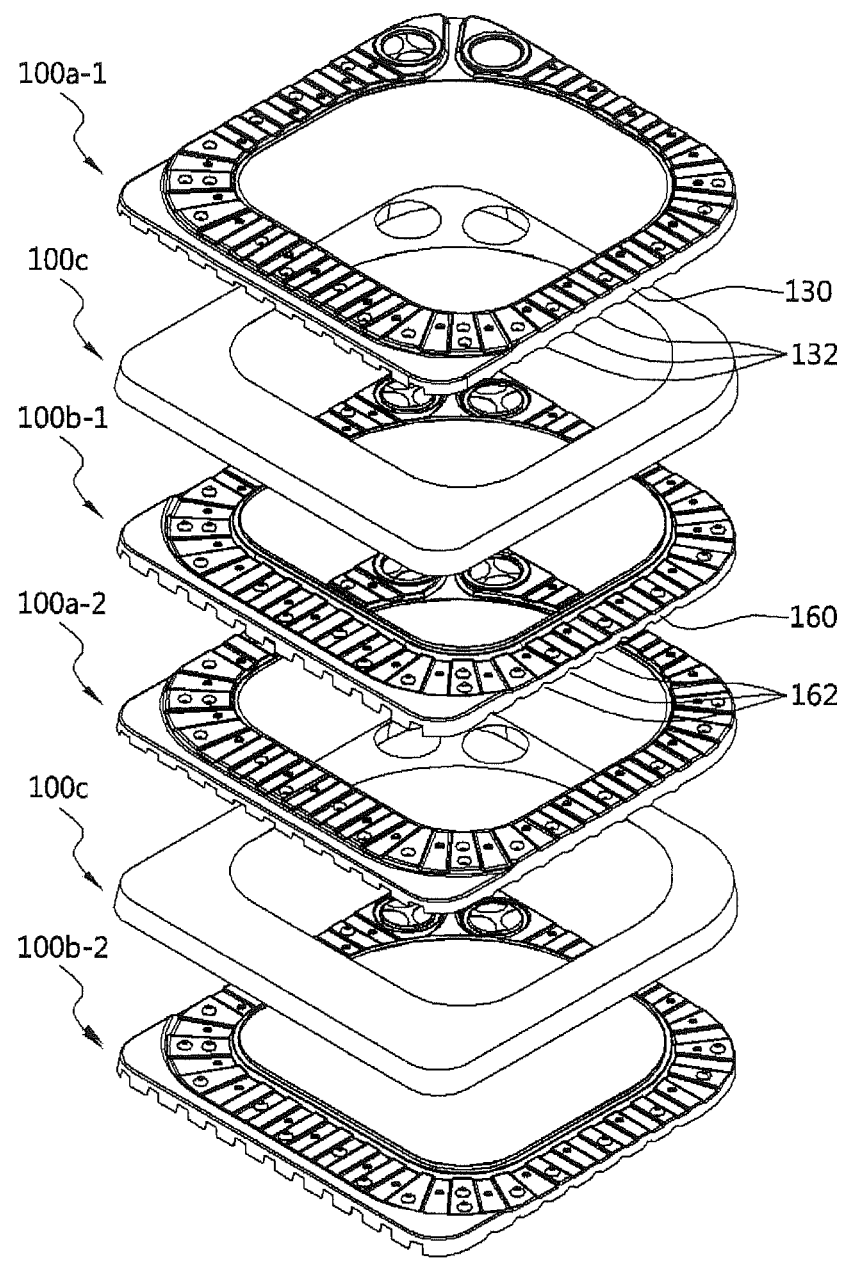
[FIG. 9]

[FIG. 10]
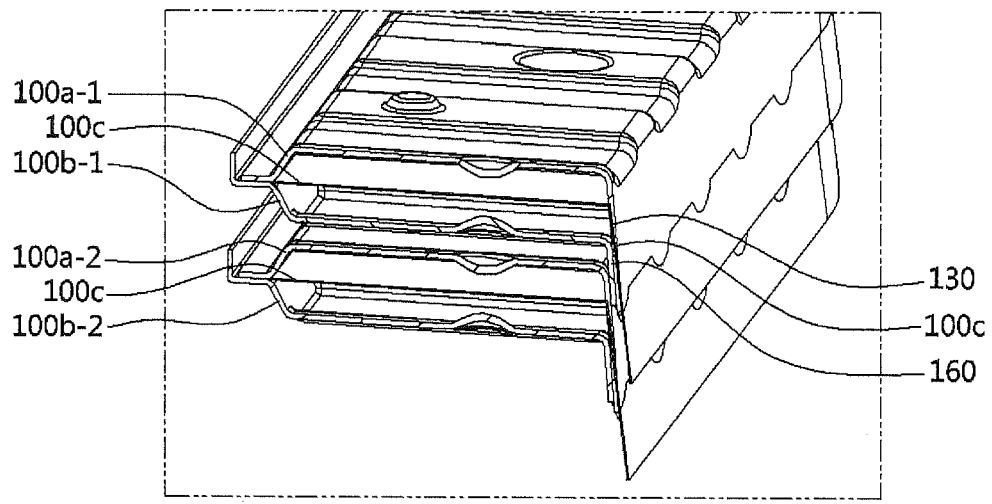
[FIG. 11]
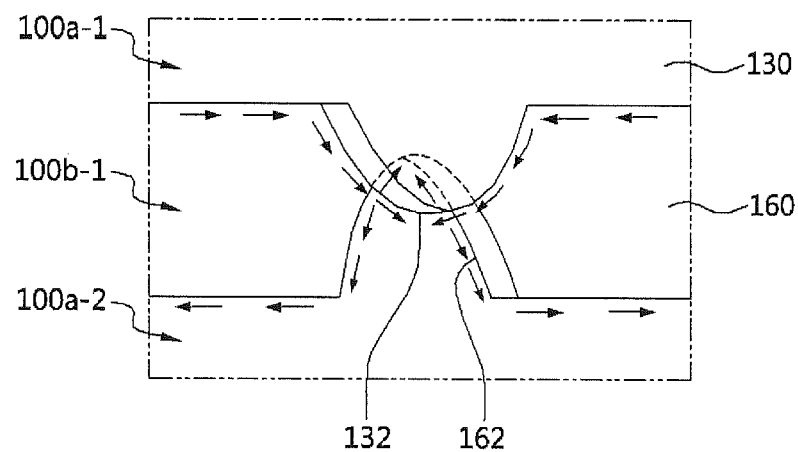

[FIG. 13]

[FIG. 15]
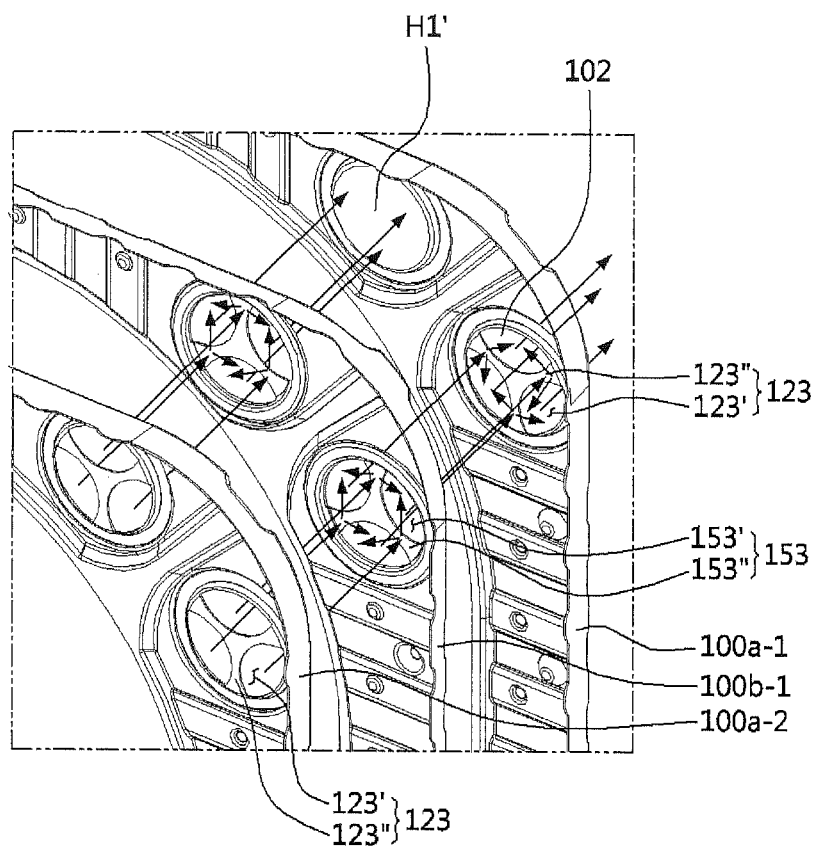

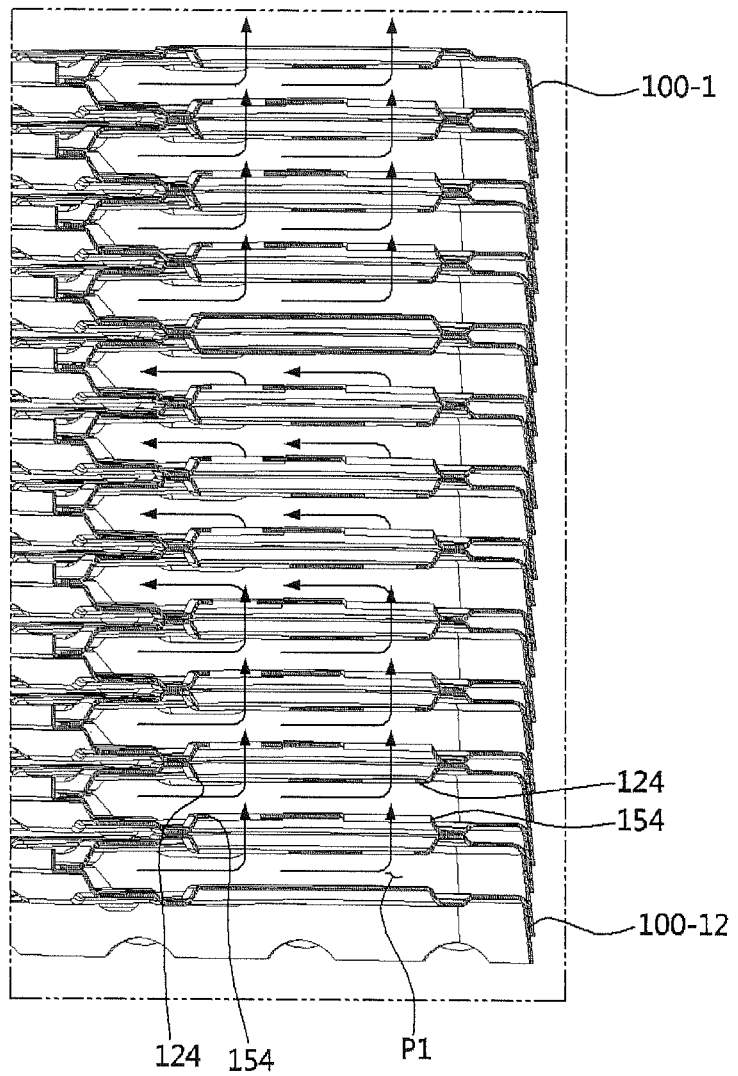
[FIG. 16]

[FIG. 17]
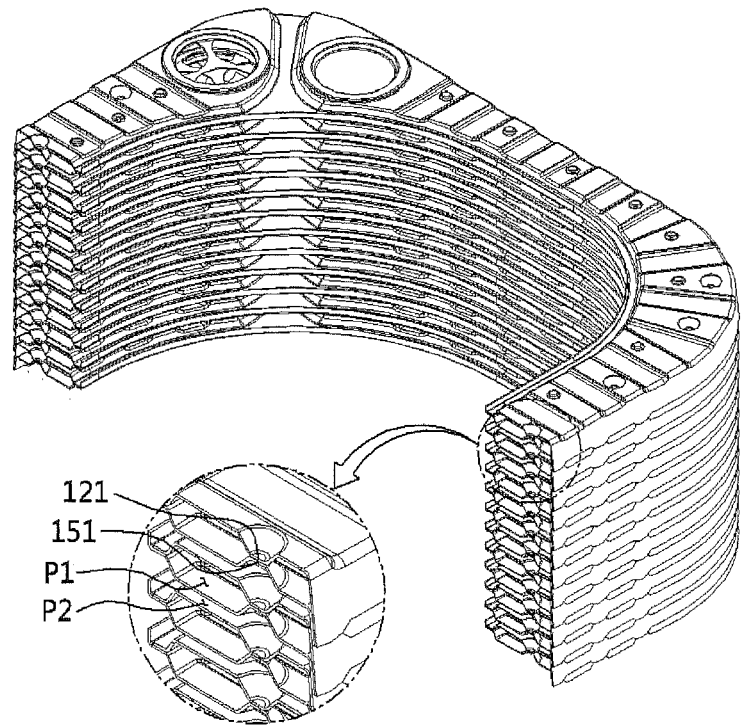
[FIG. 18]
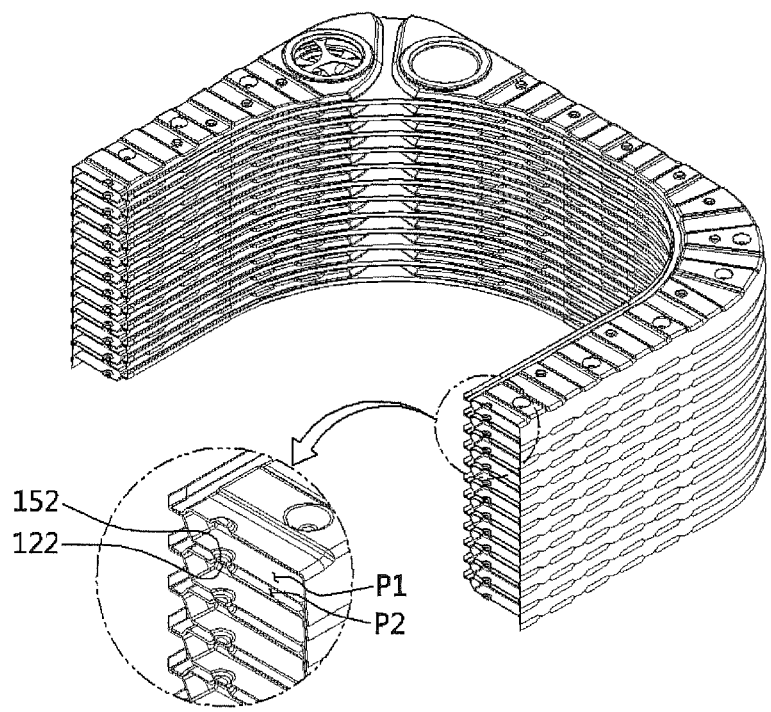

HEAT EXCHANGER

CROSS-REFERENCE TO RELATED APPLICATIONS

This application is a national stage of International Application No. PCT/KR2017/001183, filed Feb. 3, 2017, which claims the benefit of Korean Application No. 10-2016-0015085, filed Feb. 5, 2016 in the Korean Intellectual Property Office, the disclosures of which are incorporated herein by reference.

TECHNICAL FIELD

The present invention relates to a heat exchanger, and more particularly, to a heat exchanger capable of ensuring welding quality while reducing a material cost and a process cost by reducing a portion to which a welding material is applied during production of a plate-type heat exchanger having a plurality of plates stacked and welded together.

BACKGROUND ART

A boiler used for providing heating or hot water is a device configured to heat a desired site or supply hot water by heating tap water or heating water (hereinafter referred to as a "heating medium") by a heat source, wherein the boiler includes a burner configured to burn a mixture of a gas and air, and a heat exchanger configured to transfer combustion heat of a combustion gas to a heating medium.

As an example of a prior art relating to a conventional heat exchanger, Korean Registered Patent No. 10-0813807 discloses a heat exchanger including a burner disposed at a central portion of the heat exchanger, and a heat exchange tube wound around a circumference of the burner in the form of a coil.

The heat exchanger disclosed in the above-described Patent Document has problems in that, since the heat exchange tube is formed in a flat shape, the heat exchange tube is deformed into a rounded shape when a pressure is applied to a heat transfer medium portion, and, since the heat exchange tube is formed to be rolled up, a thickness of the heat transfer medium portion becomes thicker.

Further, since the conventional heat exchanger has a structure in which the heat exchange tube is wound around a combustion chamber in the form of a coil, heat exchange between the combustion gas and a heating medium is performed only in a local space around the heat exchanger formed in the form of a coil, such that there is a disadvantage in that a heat transfer area cannot be widely secured.

In order to resolve such a problem, a plate-shaped heat exchanger has recently been developed in which a plurality of plates are stacked and thus a heating medium channel and a combustion gas channel are formed in the plurality of stacked plates, such that heat exchange between a heating medium and a combustion gas is performed.

A related art relating to the above-described plate-shaped heat exchanger is disclosed in Japanese Patent Application Publication No. 2006-214628. A conventional plate heat exchanger including the plate-type heat exchanger disclosed in the above-described Patent Document is configured such that a plurality of plates are stacked and welded so as to prevent leakage of fluid between the plurality of plates.

However, the conventional plate-type heat exchanger has a structure in which a welding material is applied between adjacently stacked plates and heated and melted at a predetermined temperature for welding so that there are problems in that a material cost of the welding material increases and the number of welding processes are increased.

DISCLOSURE

Technical Problem

The present invention is directed to providing a heat exchanger capable of ensuring welding quality while reducing a material cost and a process cost by reducing a portion to which a welding material is applied during production of a plate-type heat exchanger having a plurality of plates stacked and welded together.

Technical Solution

One aspect of the present invention provides a heat exchanger including a heat exchange part in which a heating medium channel (P1), through which a heating medium flows, and a combustion gas channel (P2), through which a combustion gas combusted in a burner flows, are alternately formed adjacent to each other in a space between a plurality of plates, wherein edges of a pair of plates forming the heating medium channel (P1) are weld-coupled to form a first welding part (W1), a plate forming the combustion gas channel (P2) is welded to the edge of the plate forming the heating medium channel (P1) between the pair of plates forming the heating medium channel (P1) to form a second welding part (W2), and a guide part is formed to guide a molten solution of a welding material of the first welding part (W1) to be movable to the second welding part (W2).

Advantageous Effects

In accordance with a heat exchanger of the present invention, a guide part for guiding a molten solution of a welding material of a first welding portion to be movable to a second welding portion is formed so that welding quality can be ensured while reducing a material cost and a process cost by reducing a portion to which a welding material is applied during production of a plate-type heat exchanger having a plurality of plates stacked and welded together.

Further, a flow direction of the heating medium circulating along a circumference of a combustion chamber is formed in one direction, and thus circulation of the heating medium is smoothly performed so that a pressure drop of the heating medium is minimized and local overheating is prevented such that the heat exchange efficiency can be improved.

Furthermore, a stepped level is formed on a surface of each of a protruding portion and a recessed portion, and protrusions are configured to be brought into contact with each other at corresponding positions in a heating medium channel and a combustion gas channel so that generation of turbulent flows of the heating medium and the combustion gas is induced such that the heat exchange efficiency can be improved and, at the same time, deformation of the plurality of plates due to a pressure of fluid can be prevented and pressure resistance performance can be improved.

DESCRIPTION OF DRAWINGS

FIG. 5 is a perspective view illustrating a flow path of a heating medium.

FIG. 6 is a cross-sectional view taken along the line A-A of FIG. 2.

FIG. 7 is a partially exploded perspective view illustrating a state in which a combustion gas pass-through portion is formed at a lower portion of the heat exchanger.

FIG. 8 is a perspective view illustrating a state in which a welding material is stacked between unit plates of the heat exchanger according to the present invention.

FIG. 9 is a partially exploded perspective view of FIG. 8.

FIG. 10 is a cutaway perspective view illustrating a state in which a welding material is interposed between a plurality of plates.

FIG. 11 is a diagram for describing an action of a molten solution of a welding material flowing between ends of a flange of a plate by a guide part.

FIG. 15 is a partial perspective view for describing an action of a heating medium dispersion portion.

FIG. 16 is a cross-sectional view taken along the line C-C of FIG. 2 for describing an action of a heating medium distribution portion.

FIG. 17 is a cross-sectional perspective view taken along the line D-D in FIG. 2.

FIG. 18 is a cross-sectional perspective view taken along the line E-E in FIG. 2.

Figure 1:
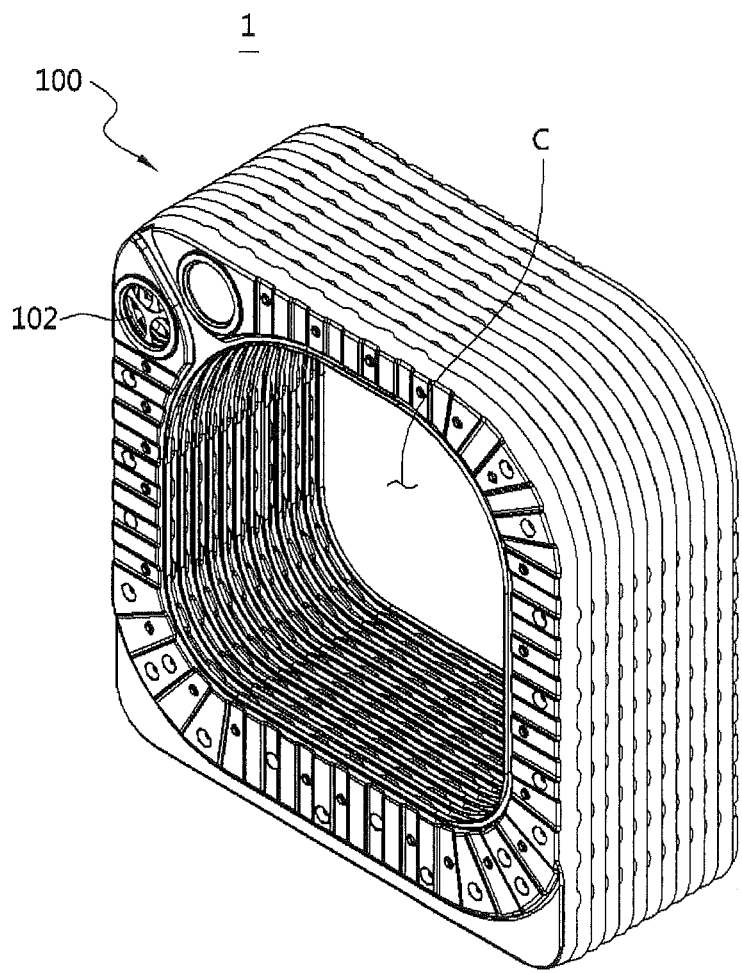
FIG. 1 is a perspective view of a heat exchanger according to one embodiment of the present invention.
Figure 2:
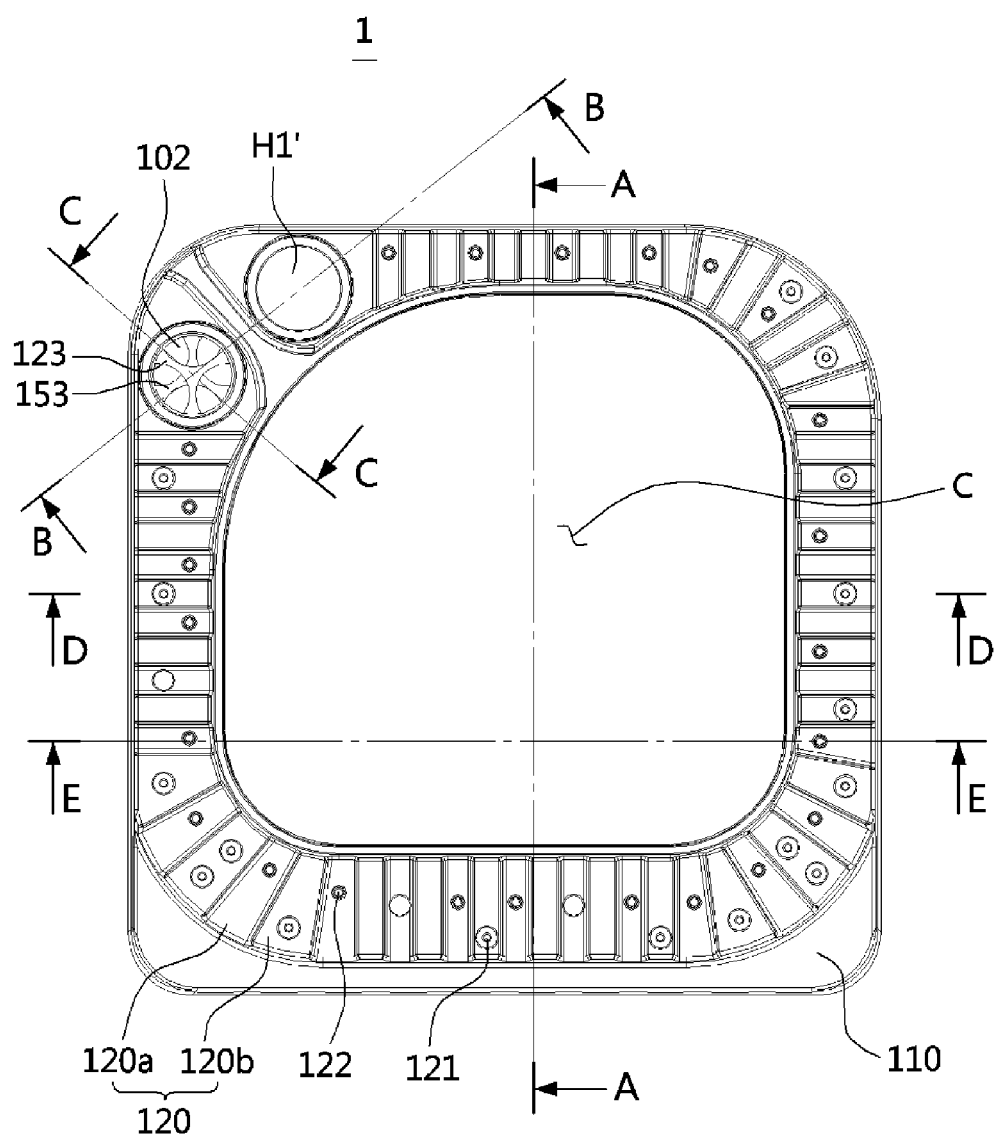
FIG. 2 is a front view of the heat exchanger according to one embodiment of the present invention.

|  Description of Reference Numerals  | |
|---|---|
| 1: heat exchanger | 100: heat exchange part |
| 100-1 to 100-12: unit plates | 100a-1 to 100a-12: first plates |
| 100B-1 to 100b-12: second plates | 100c: welding material |
| 100-A: first heat exchange part | 100-B: second heat exchange part |
| 100-C: third heat exchange part | 101: heating medium inlet |
| 102: heating medium outlet | 110: first flat surface |
| 120: protruding portion | 120a: first protruding piece |
| 120b: second protruding piece | 121: first protrusion |
| 122: second protrusion | |
| 123: first heating medium dispersion portion | |
| 123': opened portion | 123": blocking portion |
| 124: first heating medium distribution portion | |
| 130: first flange | 131: first incised portion |
| 132: convex portion | 140: second flat surface |
| 150: recessed portion | 150a: first recessed piece |
| 150b: second recessed piece | 151: third protrusion |
| 152: fourth protrusion | |
| 153: second heating medium dispersion portion | |
| 153': opened portion | 153": blocked portion |
| 154: second heating medium distribution portion | |
| 160: second flange | 161: second incised portion |
| 162: concave portion | A1: first opening |
| A2: second opening | H1 to H4: through-holes |
| H1' and H3': first blocked portions | |
| H2' and H4': second blocked portions | |
| P1: heating medium channel | |
| P2: combustion gas channel | |
| W1: first welding part | W2: second welding part |

MODES OF THE INVENTION

Hereinafter, configurations and operations for preferred embodiments of the present invention will be described in detail with reference to the accompanying drawings.

Referring to FIGS. 1 to 7, a heat exchanger 1 according to one embodiment of the present invention includes a heat exchange part 100 configured with a plurality of plates stacked at a circumference of a combustion chamber C in which combustion heat and a combustion gas are generated by combustion of a burner (not shown).

The heat exchange part 100 may have a structure in which a plurality of plates are to be upright along a longitudinal direction and are stacked from a front side to a rear side, and a plurality of heat exchange parts 100-A, 100-B, and 100-C are stacked. Therefore, the burner may be assembled by being horizontally inserted into the combustion chamber C from the front side, and thus convenience in attachment or detachment of the burner and in maintenance of the heat exchanger 1 may be improved.

For example, the plurality of plates may be configured with first to twelfth unit plates 100-1, 100-2, 100-3, 100-4, 100-5, 100-6, 100-7, 100-8, 100-9, 100-10, 100-11, and 100-12, and the first to twelfth unit plates 100-1, 100-2, 100-3, 100-4, 100-5, 100-6, 100-7, 100-8, 100-9, 100-10, 100-11, and 100-12 are configured with first plates 100a-1, 100a-2, 100a-3, 100a-4, 100a-5, 100a-6, 100a-7, 100a-8, 100a-9, 100a-10, 100a-11, and 100a-12, respectively, which are disposed at front positions of the first to twelfth unit plates 100-1, 100-2, 100-3, 100-4, 100-5, 100-6, 100-7, 100-8, 100-9, 100-10, 100-11, and 100-12, and second plates 100b-1, 100b-2, 100b-3, 100b-4, 100b-5, 100b-6, 100b-7, 100b-8, 100b-9, 100b-10, 100b-11, and 100b-12, which are stacked in rear of the first plates 100a-1, 100a-2, 100a-3, 100a-4, 100a-5, 100a-6, 100a-7, 100a-8, 100a-9, 100a-10, 100a-11, and 100a-12, respectively.

A heating medium channel P1, through which a heating medium flows, is formed between a first plate and a second plate constituting each unit plate, and a combustion gas channel P2, through which a combustion gas flows, is formed between a second plate constituting one unit plate, which is disposed at one side, among adjacently stacked unit plates and a first plate constituting another unit plate, which is disposed at the other side, thereamong. The heating medium channel P1 and the combustion gas channel P2 are alternately formed adjacent to each other between the plurality of plates to allow heat exchange between the heating medium and the combustion gas.

Figure 3:
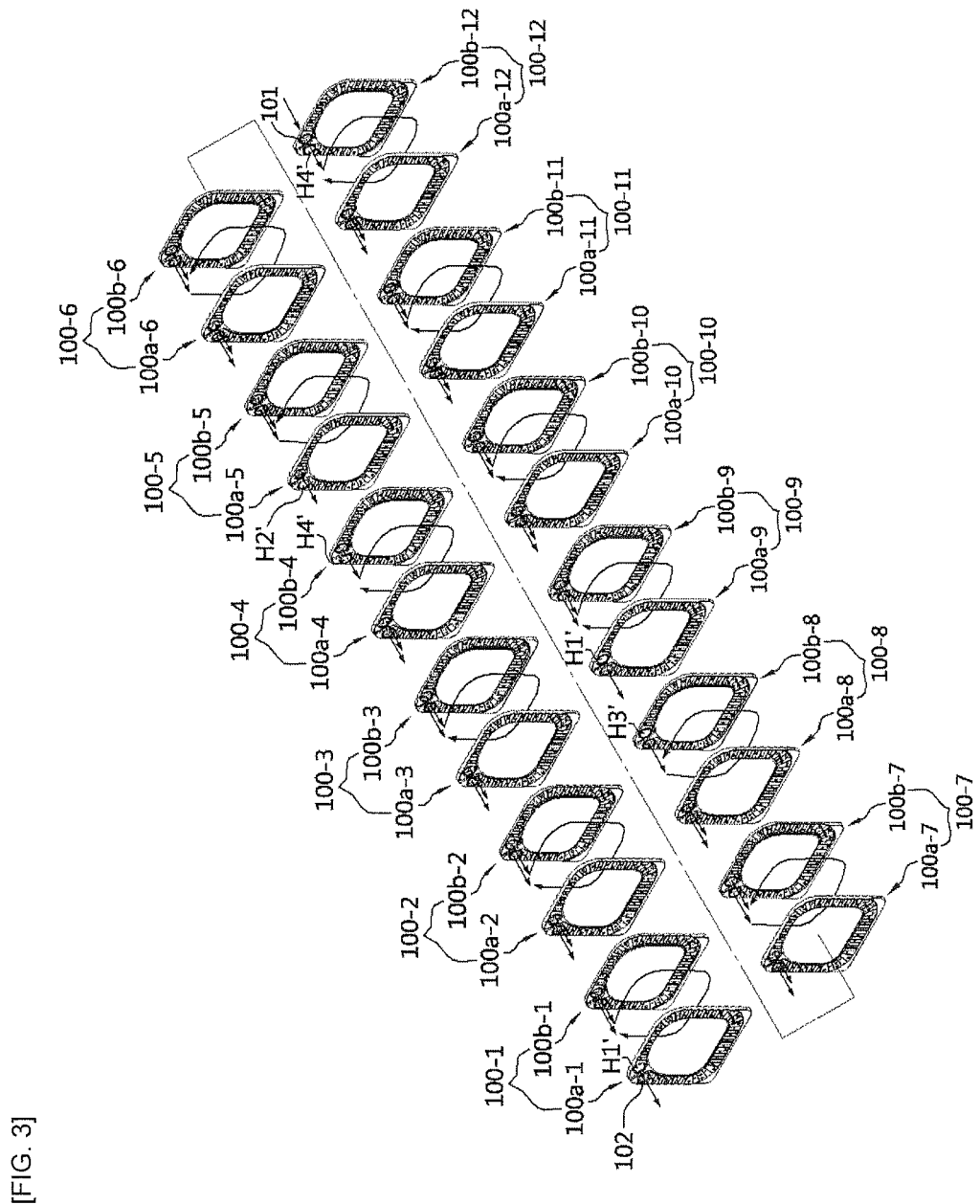
FIG. 3 is an exploded perspective view of the heat exchanger according to one embodiment of the present invention.
Figure 4:
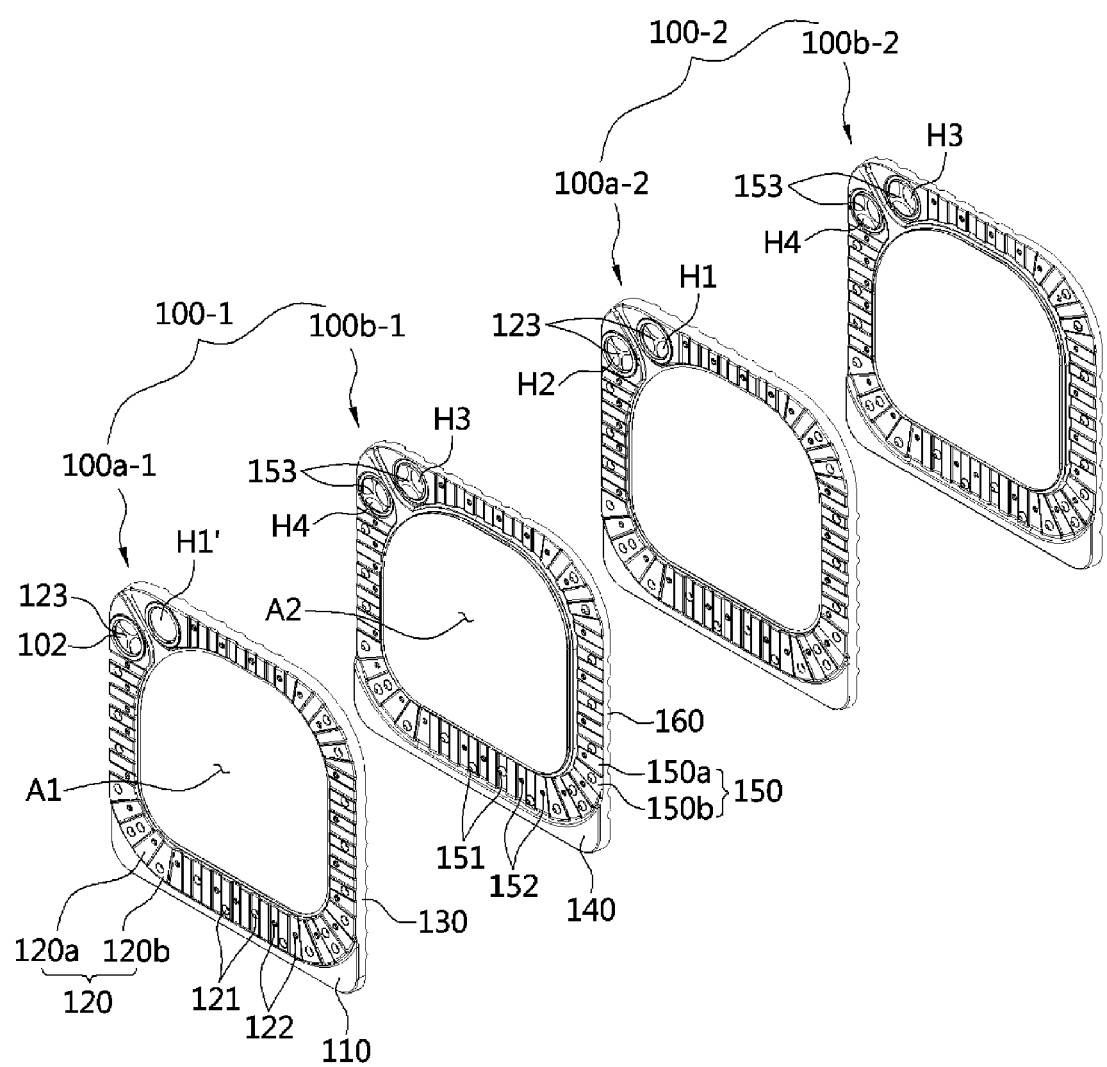
FIG. 4 is an enlarged perspective view of some unit plates shown in FIG. 3.
Figure 12:
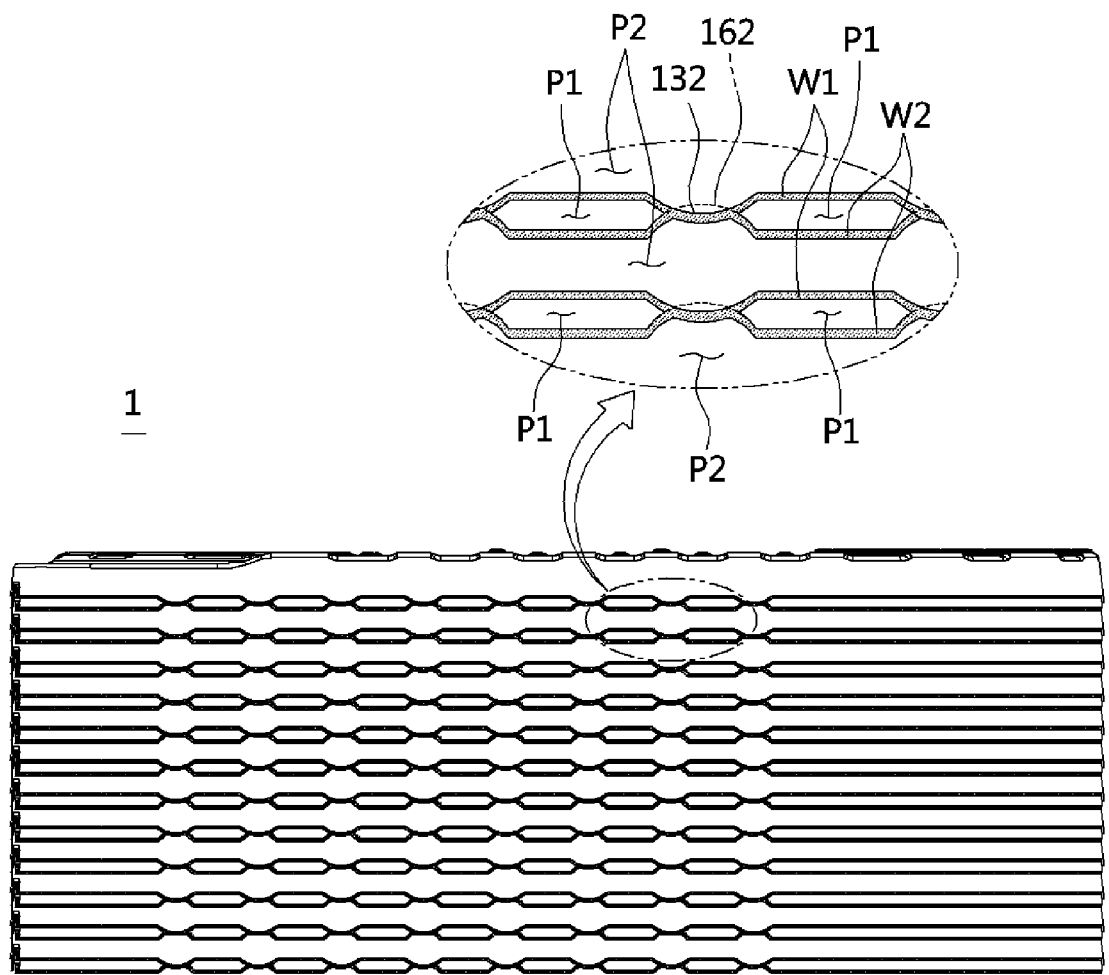
FIG. 12 is a side view illustrating a state in which welding is completed.
Figure 13:
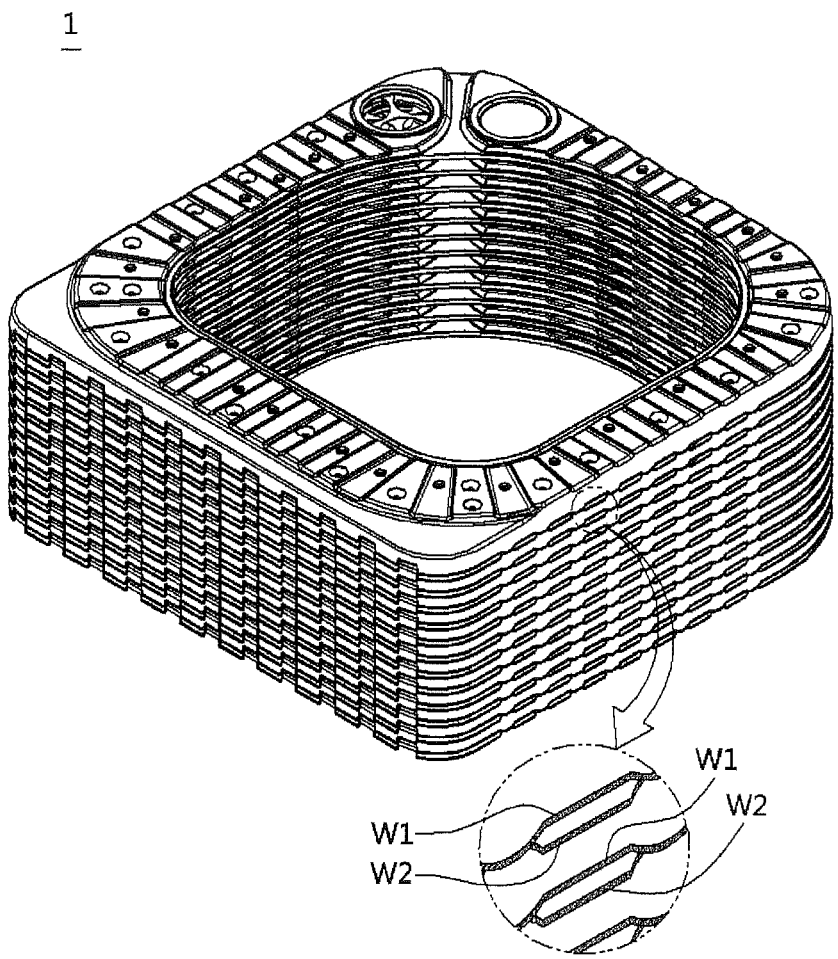
FIG. 13 is a perspective view illustrating a state in which welding is completed.

Referring to FIGS. 3 to 5, the first plate includes a first flat surface 110 having a first opening A1 formed at a central portion thereof, a protruding portion 120 formed to protrude from the first flat surface 110 to the front side and having sections being communicated in a circumferential direction, and a first flange 130 extending from an edge of the first flat surface 110 to the rear side.

The second plate includes a second flat surface 140 having a second opening A2 formed at a central portion thereof to correspond to the first opening A1 in a front-rear direction and configured to be brought into contact with the first flat surface 110, a recessed portion 150 formed to protrude from the second flat surface 140 to the rear side, having sections being communicated in a circumferential direction, and configured to form the heating medium channel P1 between the protruding portion 120 and the recessed portion 150, and a second flange 160 extending from an edge of the second flat surface 140 to the rear side and configured to be coupled to a first flange 130 of a unit plate disposed next to the second plate.

In FIGS. 3 and 5, arrows indicate flow directions of the heating medium.

Referring to FIG. 5, the heat exchange part 100 is configured in a structure in which a plurality of heat exchange parts are stacked, and, for example, the heat exchange part 100 may be configured with first heat exchange part 100-A, a second heat exchange part 100-B, and a third heat exchange part 100-C. The heating medium channel P1 in the plurality of heat exchange parts 100-A, 100-B, and 100-C is configured such that a flow direction of the heating medium is formed in only one direction. That is, a flow direction of a heating medium in each of the plurality of heat exchange parts 100-A, 100-B, and 100-C is directed in one direction, but flow directions of heating media in adjacent heat exchange parts among the plurality of heat exchange units 100-A, 100-B, and 100-C are formed in series and directed in opposite directions (a clockwise direction and a counterclockwise direction). Further, the heating medium channels P1 are formed in parallel at a plurality of unit plates constituting each of the heat exchange parts 100-A, 100-B, and 100-C.

A configuration for a unidirectional flow of the heating medium will be described below.

Referring to FIGS. 3 and 4, the first through-hole H1 and the second through-hole H2 are formed adjacent to each other at one side of an upper portion of the first plate, and the third through-hole H3 corresponding to the first through-hole H1 and the fourth through-hole H4 corresponding to the second through-hole H2 are formed at one side of an upper portion of the second plate.

At one side of an upper portion of the first plate 100*a*-1 disposed at a foremost position, a first blocked portion H1' is formed at a position corresponding to the first through-hole H1, and the heating medium outlet 102 is formed at a position corresponding to the second through-hole H2.

At one side of an upper portion of the second plate 100*b*-12 disposed at a rearmost position, the heating medium inlet 101 is formed at a position corresponding to the third through-hole H3, and a fourth blocked portion H4' is formed at a position corresponding to the fourth through-hole H4.

Further, the fourth blocked portion H4' is formed at a position corresponding to the fourth through-hole H4 on the second plate 100*b*-4 of the fourth unit plate 100-4, a second blocked portion H2' is formed at a position corresponding to the second through-hole H2 on the first plate 100*a*-5 of the fifth unit plate 100-5, a third blocked portion H3' is formed at a position corresponding to the third through-hole H3 on the second plate 100*b*-8 of the eighth unit plate 100-8, and the first blocked portion H1' is formed at a position corresponding to the first through-hole H1, on the first plate 100*a*-9 of the ninth plate 100-9.

Therefore, a heating medium flowing into the heating medium channel P1 of the twelfth unit plate 100-12 through the heating medium inlet 101 formed in the second plate 100*b*-12 of the twelfth unit plate 100-12 disposed at the rearmost position flows to the front side through the first to fourth through-holes H1, H2, H3, and H4 formed in the twelfth to ninth unit plates 100-12, 100-11, 100-10, and 100-9, and at the same time, since the first blocked portion H1' is formed at the first plate 100*a*-9 of the nine unit plate 100-9, the heating medium flows in a clockwise direction in the heating medium channels P1 inside the twelfth to ninth unit plates 100-12, 100-11, 100-10, and 100-9.

Further, the heating medium flowing into the heating medium channel P1 of the eighth unit plate 100-8 through the second through-hole H2 formed in the first plate 100*a*-9 of the ninth unit plate 100-9 and the fourth through-hole H4 formed in the second plate 100*b*-8 of the eighth unit plate 100-8 flows to the front side through the first to fourth through-holes H1, H2, H3, and H4 formed in the eighth to fifth unit plates 100-8, 100-7, 100-6, and 100-5, and at the same time, since the second blocked portion H2' is formed at the first plate 100*a*-5 of the fifth unit plate 100-5, the heating medium flows in a counterclockwise direction in the heating medium channels P1 inside the eighth to fifth unit plates 100-8, 100-7, 100-6, and 100-5.

Furthermore, the heating medium flowing into the heating medium channel P1 of the fourth unit plate 100-4 through the first through-hole H1 formed in the first plate 100*a*-5 of the fifth unit plate 100-5 and the third through-hole H3 formed in the second plate 100*b*-5 of the fourth unit plate 100-4 flows to the front side through the first to fourth through-holes H1, H2, H3, and H4 formed into the fourth to first unit plates 100-4, 100-3, 100-2, and 100-1, and at the same time, since the first blocked portion H1' is formed at the first plate 100*a*-1 of the first unit plate 100-1, the heating medium flows in the clockwise direction in the heating medium channels P1 inside the fourth to first unit plates 100-4, 100-3, 100-2, and 100-1.

As described above, in the structure in which the heat exchange part 100 is formed to be upright along a longitudinal direction, heating medium connection channels configured with the heating medium channels P1 and the first to fourth through-holes H1, H2, H3, and H4 are formed to allow the heating medium to flow in one direction so that the heating medium flowing along the circumference of the combustion chamber C circulates smoothly such that a pressure drop of the heating medium is minimized and local overheating thereof is prevented, thus improving thermal efficiency.

Further, a capacity of the heat exchanger may be increased without a pressure drop by adjusting the number of parallel channels in each of the heat exchange parts 100-A, 100-B, and 100-C when the capacity of the heat exchanger is increased.

Referring to FIGS. 6 and 7, the combustion gas generated by combustion of the burner in the combustion chamber C is discharged downward through the lower portion of the heat exchange part 100.

As a configuration for allowing the combustion gas to be smoothly discharged by passing through the combustion gas channels P2, a configuration in which the first and second plates are stacked, the first flange 130 of the first plate and the second flange 160 of the second plate are partially overlapped with each other, and the combustion gas pass-through portion D through which the combustion gas, which is flowing by passing through the combustion gas channels P2, is discharged is formed at some region of the edges of the first plate and the second plate.

A plurality of first incised portions 131 are formed at a combustion gas discharge side of the first flange 130, a plurality of second incised portions 161 are formed at a combustion gas discharge side of the second flange 160, and when the first plate and the second plate are stacked, the combustion gas pass-through portion D is formed at some regions of the first incised portion 131 and the second incised portion 161.

A plurality of combustion gas pass-through portions D are formed to be spaced apart from each other in lateral and longitudinal directions at the lower portion of the heat exchange part 100, and thus the combustion gas passing through the heat exchange part 100 may be distributed and discharged at a uniform flow rate across an entire region of the lower portion of the heat exchange part 100 such that flow resistance of the discharged combustion gas is reduced and noise and vibration are prevented.

Hereinafter, a configuration and an action in which a plurality of plates are stacked and welded will be described with reference to FIGS. 8 to 13.

The plurality of plates are configured in a structure capable of being welded using a welding material 100c which is commonly used by a first welding part W1 in which an end of the first flange 130 of the first plate and an end of the second flange 160 of the second plate are welded, wherein the first plate and the second plate form the heating medium channel P1, and a second welding portion W2 in which an end of the second flange 160 formed at a second plate of a unit plate disposed at one side of adjacent unit plates and an end of the first flange 130 formed at a first plate of a unit plate disposed at the other side of the adjacent unit plates are welded.

As a configuration for the foregoing, guide parts 132 and 162 are included to guide a molten solution of a welding material of the first welding part W1 to be movable to the second welding part W2.

The guide parts 132 and 162 include a convex portion 132 convexly protruding outward from an edge of a first plate, which is disposed at one side and forms the heating medium channel P1, and a concave portion 162 incised inward from an edge of a second plate, which is disposed at the other side and forms the heating medium channel P1, and partially overlapping with the convex portion 132 to form a gap to allow a molten solution of the welding material 100c to be movable.

The convex portion 132 and the concave portion 162 are respectively formed along the edges of the first plate and the second plate at predetermined intervals.

Therefore, as indicated by an arrow in FIG. 11, the molten solution of the welding material 100c applied between the first plate 100a-1 and the second plate 100b-1 flows along the gap formed at the overlapping region between the convex portion 132 and the concave portion 162 to form the first welding part W1 at a boundary between the first plate 100a-1 and the second plate 100b-1, and, at the same time, the molten solution further flows to a boundary between the second plate 100b-1 and the first plate 100a-2 adjacent thereto to form the second welding part W2.

As shown in FIG. 9, even though the welding material 100c is alternately applied between the plurality of plates, the first plate, the second plate, and the first plate adjacent thereto may be simultaneously welded. To compare with a conventional structure in which a welding material is applied between every plate, in the present invention, it is possible to ensure welding quality while reducing a material cost and a production cost by reducing a region to which the welding material is applied during production of the plate-type heat exchanger.

Meanwhile, in a section where the flow direction of the heating medium is switched in the heat exchange parts 100-A, 100-B, and 100-C, that is, a section connected from the third heat exchange part 100-C to the second heat exchange part 100-B, or a section connected from the second heat exchange part 100-B to the first heat exchange part 100-A, a flow rate of the heating medium flowing to the heating medium channel P1 formed in each of the heat exchange parts 100-A, 100-B, and 100-C may tend to be unevenly distributed by inertia and pressure.

As described above, when a flow rate is unevenly distributed to the heating medium channels P1, there are problems in that performance of heat exchange is degraded, and noise and foreign materials are generated due to boiling of the heating medium caused by local overheating in a region where the flow rate is low.

Figure 14:
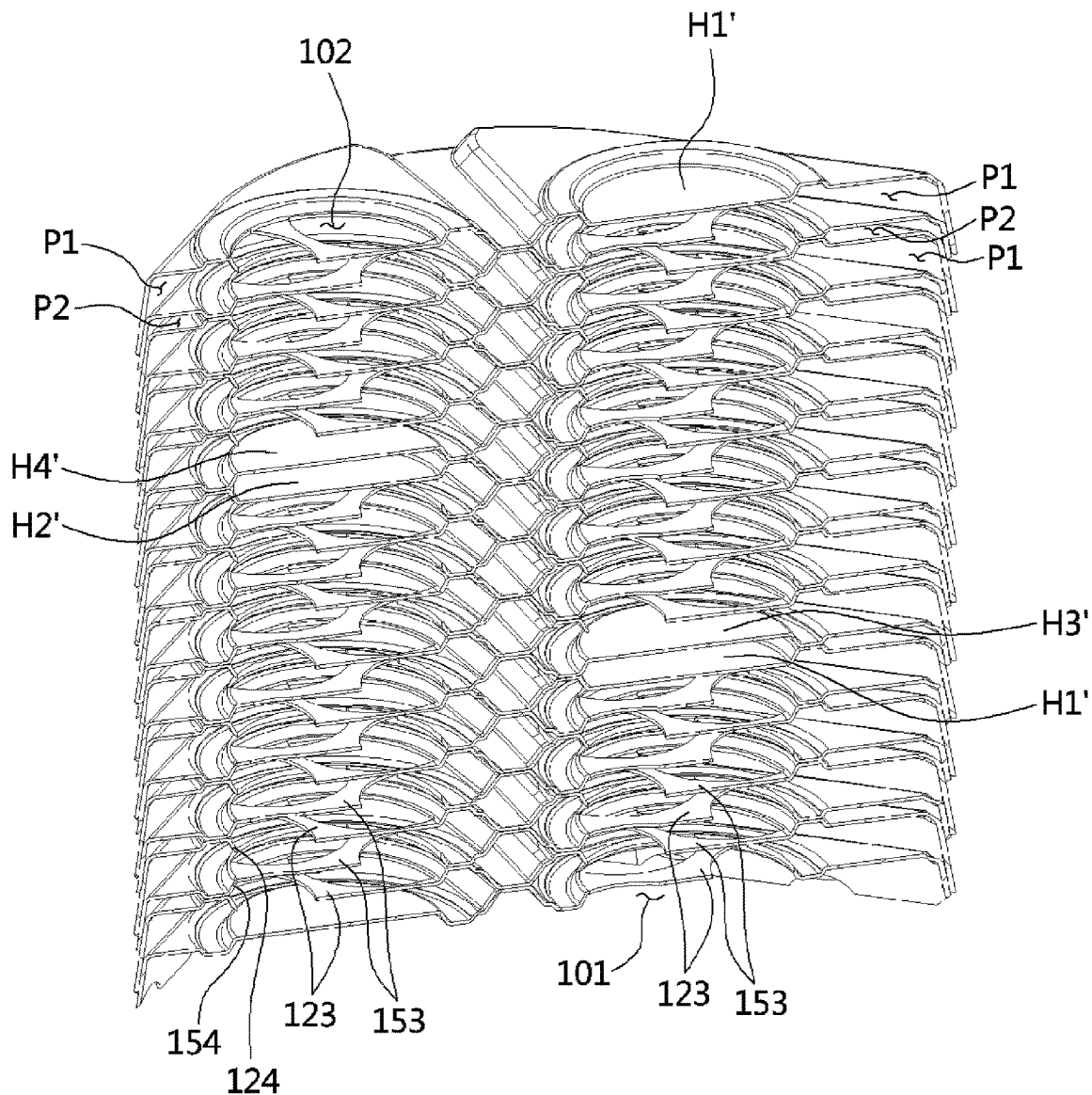
FIG. 14 is a cross-sectional perspective view taken along the line B-B in FIG. 2.

As a part for resolving the problem of non-uniform distribution in flow rate of the heating medium, as shown in FIGS. 14 and 15, heating medium dispersion portions 123 and 153, at which opened portions 123' and 153' and blocked portions 123" and 153" are formed, are provided at inlet parts, through which the heating medium flows into the heating medium channel P1, or outlet parts, through which the heating medium flows out from the heating medium channel P1.

A plurality of heating medium dispersion portions 123 and 153 are provided to be spaced apart in the flow direction of the heating medium, and the opened portions 123' and 153' and the blocked portions 123" and 153" are provided to intersect with each other along the flow direction of the heating medium between adjacently disposed heating medium dispersion portions 123 and 153.

The opened portions 123' and 153' and the blocked portions 123" and 153" are alternately formed in the heating medium dispersion portions 123 and 153 in a circumferential direction thereof.

Thus, as indicated by arrows in FIG. 15, the heating medium having passed through a first opened portion 123' formed at the first heating medium dispersion portion 123 is dispersed by colliding with a second blocked portion 153" of the second heating medium dispersion portion 153 located behind the first opened portion 123', and the heating medium having passed through a second opened portion 153' formed at the second heating medium dispersion portion 153 is dispersed by colliding with the first blocked portion 123" of the first heating medium dispersion portion 123 located behind the second opened portion 153', and inertia of the heating medium is alleviated by such a dispersion action so that a flow rate of the heating medium flowing to the heating medium channel P1 of each layer may be evenly adjusted.

As another part for resolving the problem of non-uniform distribution in flow rate of the heating medium, as shown in FIGS. 14 and 16, heating medium distribution portions 124 and 154 are provided at portions of the heating medium channel P1 where the flow direction of the heating medium is switched, thereby narrowing the heating medium channel P1.

The heating medium distribution portions 124 and 154 may be formed in embossed shapes protruding toward the heating medium channel P1 in portions where the heating medium flows into and out from the heating medium channel P1.

Therefore, a cross-sectional area of a channel formed between a first heating medium distribution portion 124 formed at the first plate and a second heating medium distribution portion 154 formed at the second plate is formed to be smaller than a cross-sectional area of the heating medium channel P1 formed between the first plate and the second plate, and thus a phenomenon in which the heating medium is intensively flowed into some of the heating medium channels P1 of layers may be prevented so that a flow rate of the heating medium flowing through the heating medium channel P1 of each layer may be evenly adjusted.

Meanwhile, referring to FIG. 4, the protruding portion 120 formed at the first plate is configured such that a first protruding piece 120a and a second protruding piece 120b having different heights in a front-rear direction are alternately disposed along a circumferential direction, and the recessed portion 150 formed at the second plate is configured such that a first recessed piece 150a and a second recessed piece 150b having different heights in the front-rear direction are alternately disposed along the circumferential direction. As described above, a stepped level is formed at each of the protruding portion 120 and the recessed portion 150 so that heat exchange efficiency may be improved by inducing a turbulent flow to be actively generated in the flows of the heating medium and the combustion gas.

Referring to FIG. 17, a plurality of first protrusions 121 protruding toward the heating medium channel P1 are formed in the protruding portion 120, and a plurality of third protrusions 151 protruding toward the heating medium channel P1 and being brought into contact with the plurality of first protrusions 121 are formed at the recessed portion 150.

Further, referring to FIG. 18, a plurality of second protrusions 122 protruding toward the combustion gas channel P2 are formed in the protruding portion 120, and a plurality of fourth protrusions 152 protruding toward the combustion gas channel P2 and being brought into contact with the plurality of second protrusions 122 are formed in the recessed portion 150. Thus, the first protrusion 121 and the third protrusion 151 protrude inward toward the heating medium channel P1 and are brought into contact with each other, and the second protrusion 122 and the fourth protrusion 152 protrude inward toward the combustion gas channel P2 and are brought into contact with each other so that heat exchange efficiency can be improved by inducing a turbulent flow to be generated in the flows of the heating medium and the combustion gas, and at the same time, deformation of the plates due to a pressure of fluid can be prevented and pressure resistance performance can be improved.

The invention claimed is:

1. A heat exchanger comprising:
a plurality of plates; and
a heat exchange part in which a heating medium channel (P1), through which a heating medium flows, and a combustion gas channel (P2), through which a combustion gas combusted in a burner flows, are alternately formed adjacent to each other in a space between the plurality of plates,
wherein edges of a pair of plates forming the heating medium channel (P1) among the plurality of plates are weld-coupled to form a first welding part (W1),
edges of a pair of plates forming the combustion gas channel (P2) among the plurality of plates are weld-coupled to form a second welding part (W2), the pair of plates forming the combustion gas channel (P2) being a first plate and a second plate, and
a guide part is formed to guide a molten solution of a welding material of the first welding part (W1) to be movable to the second welding part (W2),
wherein the guide part includes:
a convex portion (132) convexly protruding outward from an edge of the first plate, which is disposed at one side and forms the heating medium channel (P1); and
a concave portion (162) recessed inward from an edge of the second plate, which is disposed at the other side and forms the heating medium channel (P1), partially overlapping with the convex portion (132), and forming a gap to allow the molten solution of the welding material to be movable,
wherein a plurality of convex portions (132) are formed along the edge of the first plate at predetermined intervals, and a plurality of concave portions (162) are formed along the edge of the second plate at predetermined intervals.

2. The heat exchanger of claim 1, wherein:
the plurality of plates are formed by stacking a plurality of unit plates, wherein a first plate and a second plate are stacked in each of the plurality of unit plates,
the heating medium channel (P1) is formed between the first plate and the second plate,
the combustion gas channel (P2) is formed between a second plate of a unit plate disposed at one side of adjacently disposed unit plates, and a first plate of a unit plate disposed at the other side of the adjacently disposed unit plates, and
the welding material is interposed between the first plate and the second plate which form the heating medium channel (P1).

3. The heat exchanger of claim 1, wherein:
the plurality of plates are formed by stacking a plurality of unit plates, wherein a first plate and a second plate are stacked in each of the plurality of unit plates,
a first flat surface (110) having a first opening (A1) formed at a central portion thereof, a protruding portion (120) formed to protrude from the first flat surface (110) to a front side and having sections being communicated in a circumferential direction, and a first flange (130) extending from an edge of the first flat surface (110) to a rear side are formed on the first plate,
a second flat surface (140) having a second opening (A2) formed at a central portion thereof to correspond to the first opening (A1) in a front-rear direction and configured to be brought into contact with the first flat surface (110), a recessed portion (150) formed to protrude from the second flat surface (140) to a rear side, having sections being communicated in a circumferential direction, and configured to form the heating medium channel (P1) between the protruding portion (120) and the recessed portion (150), and a second flange (160) extending from an edge of the second flat surface (140) to the rear side and configured to be coupled to the first flange (130) of a unit plate, which is disposed next to the second plate, are formed on the second plate, and
the guide part is formed at an edge of each of the first flange (130) and the second flange (160).

4. The heat exchanger of claim 3, wherein:
the protruding portion (120) is configured with a first protruding piece (120a) and a second protruding piece (120b), which are alternately disposed along a circumferential direction and have different heights in the front-rear direction, and
the recessed portion (150) is configured with a first recessed piece (150a) and a second recessed piece (150b), which are alternately disposed along the circumferential direction and have different heights in the front-rear direction.

5. The heat exchanger of claim 3, wherein:
a plurality of protrusions (121) protruding toward the heating medium channel (P1) are formed at the protruding portion (120), and
a plurality of protrusions (151) protruding toward the heating medium channel (P1) and being brought into contact with the plurality of protrusions (121) are formed at the recessed portion (150).

6. The heat exchanger of claim 3, wherein:
a plurality of protrusions (122) protruding toward the combustion gas channel (P2) are formed at the protruding portion (120), and a plurality of protrusions (152) protruding toward the combustion gas channel (P2) and being brought into contact with the plurality of protrusions (122) are formed at the recessed portion (150).

7. The heat exchanger of claim 1, wherein:

the heat exchange part is configured to surround a combustion chamber (C) provided at a central portion of the heat exchange part, and a plurality of the heat exchange part is provided in a stacked structure, and each of the heating medium channels (P1) of the plurality of heat exchange parts is formed to direct a flow of the heating medium in one direction, and the heating medium channels (P1) of adjacently disposed heat exchange parts among the plurality of heat exchange parts are formed in series to direct flows of the heating media in opposite directions.

8. The heat exchanger of claim 7, wherein the heating medium channels (P1) are formed in parallel inside each of the plurality of heat exchange parts.

9. The heat exchanger of claim 7, wherein:

through-holes (H1 and H3) at one side and through-holes (H2 and H4) at the other side for providing a heating medium connection channel to allow the heating medium to flow in one direction between adjacently stacked heat exchange parts, first blocked portions (H1' and H3') for inducing the heating medium flowing into the heating medium channel (P1) through the through-holes (H1 and H3) at the one side to flow to the through-holes (H2 and H4) at the other side via a circumference of the combustion chamber (C) in one direction, and second blocked portions (H2' and H4') for inducing the heating medium flowing into the heating medium channel (P1) through the through-holes (H2 and H4) at the other side to flow to the through-holes (H1 and H3) at the one side via the circumference of the combustion chamber (C) in an opposite direction are formed at one side of a portion of the heat exchange part.

* * * * *